United States Patent
Cavallaro Corti

(10) Patent No.: US 12,438,783 B2
(45) Date of Patent: Oct. 7, 2025

(54) NETWORK MONITORING SYSTEM AND METHOD INCLUDING SOFTWARE AGENTS

(71) Applicant: Nozomi Networks Sagl, Mendrisio (CH)

(72) Inventor: Alessandro Cavallaro Corti, Varese (IT)

(73) Assignee: Nozomi Networks Sagi, Mendrisio (CH)

( * ) Notice: Subject to any disclaimer, the term of this patent is extended or adjusted under 35 U.S.C. 154(b) by 93 days.

(21) Appl. No.: 18/508,414

(22) Filed: Nov. 14, 2023

(65) Prior Publication Data
US 2025/0158893 A1    May 15, 2025

(51) Int. Cl.
G06F 15/173 (2006.01)
H04L 41/14 (2022.01)
H04L 43/12 (2022.01)
H04L 45/74 (2022.01)

(52) U.S. Cl.
CPC ............ H04L 41/145 (2013.01); H04L 43/12 (2013.01); H04L 45/74 (2013.01)

(58) Field of Classification Search
CPC ........ H04L 41/145; H04L 43/12; H04L 45/74
See application file for complete search history.

(56) References Cited

U.S. PATENT DOCUMENTS

| | | | |
|---|---|---|---|
| 2008/0222287 A1 | 9/2008 | Bahl | |
| 2015/0256414 A1* | 9/2015 | Koide | H04L 41/342 715/735 |
| 2016/0359709 A1* | 12/2016 | Deen | G06F 3/04847 |
| 2018/0309637 A1 | 10/2018 | Gill et al. | |
| 2023/0006899 A1 | 1/2023 | Nechushtan et al. | |

(Continued)

*Primary Examiner* — Joseph R Maniwang
(74) *Attorney, Agent, or Firm* — Jason Lee DeFrancesco

(57) ABSTRACT

Network monitoring system (100) comprising: a communication network (NT) comprising a plurality of nodes ($N_1$-$N_N$) and a plurality of node connections ($E_1$-$E_P$); wherein each node comprises an asset ($AS_1$-$AS_F$) configured to receive/transmit packets; a plurality of software agents ($AG_1$-$AG_N$) each installed in at least part of said plurality of nodes; each software agent being configured to redirect packets from a respective asset; at least one monitoring computer (CS) provided with software resources configured to: receive the packets sent by each software agent ($AG_1$-$AG_N$); extract from said packets source addresses and destination addresses; identify the plurality of nodes ($N_1$-$N_N$) and the plurality of node connections ($E_1$-$E_P$) from said source and destination addresses and associate each node to a corresponding node identifier; constructing an abstract model (200) representing said communication network (NT), wherein each node is represented by the corresponding node identifier and each node connection is represented by a corresponding link between respective nodes.

14 Claims, 3 Drawing Sheets

(56) References Cited

U.S. PATENT DOCUMENTS

2023/0171169 A1\* 6/2023 Zhong .................... H04L 41/12
                                                          709/224
2025/0062963 A1\* 2/2025 Hild ........................ G06N 3/08

\* cited by examiner

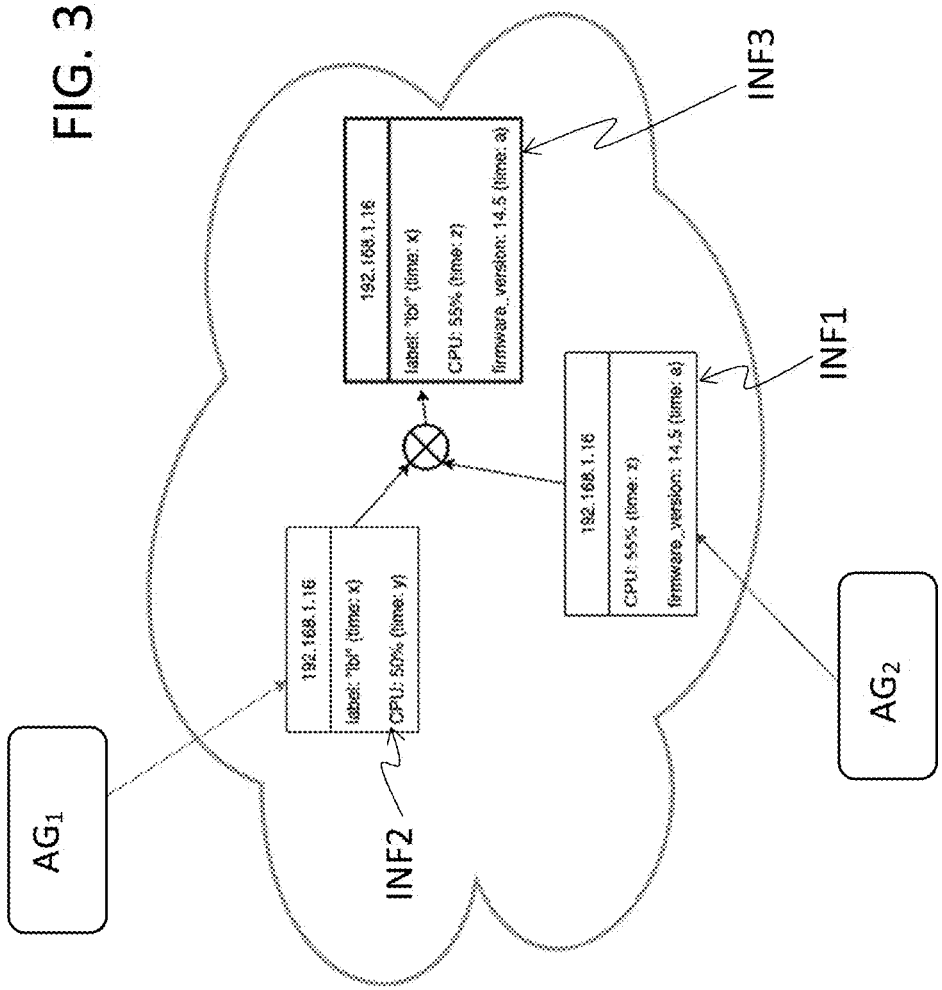

NETWORK MONITORING SYSTEM AND METHOD INCLUDING SOFTWARE AGENTS

FIELD OF INVENTION

The present invention relates to the field of network monitoring for network visibility.

BACKGROUND ART

Network visibility refers to the process of creating visual representations of networks, performance metrics, and data flows. It can also be defined as the ability to monitor and analyze network traffic to identify potential problems, security threats, and performance bottlenecks. This can be done with the following functions: topology graph, bilayer map, dependency graph, visualization chart.

These capabilities allow users to view the physical and logical relationships between routers, switches, servers, and other devices to quickly identify and correct performance issues. Typically, in network topologies allows IT staff visualizing the network and seeing what is happening on the network in real time, enabling proactive identification and resolution of problems before they affect end users.

Network monitoring and visibility (including anomaly detection and asset inventory) can be achieved via packet sniffing and Deep Packet Inspection (DPI) by attaching a dedicated appliance to a network switch or router that supports traffic mirroring. This type of approach is described in document U.S. Pat. No. 1,095,583.

It is noted that such approach could be hard to apply to some networks because it requires dedicated hardware, dedicated configuration and sniffing at the correct network level is not always possible or desirable.

BRIEF DESCRIPTION OF THE INVENTION

The Applicant observes that achieving network visibility by techniques alternative to those known and not requiring dedicated hardware is desirable.

According to a first aspect, the present disclosure refers to a network monitoring system comprising:
- a communication network comprising a plurality of nodes and a plurality of node connections; wherein each node comprises an asset configured to receive/transmit packets;
- a plurality of software agents each installed in at least part of said plurality of nodes; each software agent being configured to redirect packets from a respective asset;
- at least one monitoring computer provided with software resources configured to:
- receive the packets sent by each software agent;
- extract from said packets source addresses and destination addresses;
- identify the plurality of nodes and the plurality of node connections from said source and destination addresses and associate each node to a corresponding node identifier;
- constructing an abstract model representing said communication network, wherein each node is represented by the corresponding node identifier and each node connection is represented by a corresponding link between respective nodes.

Particularly, said software resources are part of a cloud computing service. In an embodiment, the software resources are configured to construct the abstract model under the form of a displayable topological graph.

According to an example, the software resources are configured so as said source addresses and destination addresses include addresses of the network layer; moreover, the software resources are configured to identify links between nodes processing said addresses of the network layer. In accordance with an embodiment, the software resources are configured so as said source addresses and destination addresses include addresses of the physical layer; moreover, the software resources are configured to identify links between nodes processing said addresses of the physical layer.

In accordance with an example, the software resources have Deep Packet Inspection capabilities.

In an embodiment, the network monitoring system is so as: the plurality of nodes are associated to a managing entity and the communication network further includes at least one public network device.

In accordance with an example, of the network monitoring system, a first node of said plurality of nodes includes a first asset comprising a computer running any version of Windows, Linux or macOS.

Particularly, the plurality of software agents is configured to operate as packet sniffers. More particularly, the plurality of software agents is configured to operate as packet sniffers and extract from said packet at least one of the following technical information relating to each asset: host label, operating system version, firmware version in case of an Operation Technology device, Central Processing Unit usage, RAM Random Access Memory usage, disk usage, installed software. According to an example, the plurality of software agents is configured to associate to the technical information relating to each asset a timestamp representing an extraction time.

In an embodiment, the said software resources are configured to: perform a merging process by processing the technical information received by the plurality of software agents; and associate to each node of the abstract model a corresponding technical information relating to the corresponding asset.

Particularly, said software resources are configured to: receive from a first software agent a first value assumed by a technical information key; the first value being associated with a first timestamp value and related to a selected node; receive from a second software agent a second value assumed by said technical information key; the second value being associated with a second timestamp value and related to said selected node; selectively associate to the abstract model the first value and the second value depending on said first and second timestamp values. In accordance with an embodiment, said software resource and/or said plurality of agents is configured to perform anomaly detection.

According to a second aspect, the present disclosure refers to a network monitoring method comprising:
- accessing a communication network comprising a plurality of nodes and a plurality of node connections; wherein each node comprises an asset configured to receive/transmit packets;
- providing a plurality of software agents each installed in at least part of said plurality of nodes; each software agent being configured to redirect packets from a respective asset;
- providing at least one monitoring computer having software resources configured to:
- receive the packets sent by each software agent;
- extract from said packets source addresses and destination addresses;

identify the plurality of nodes and the plurality of node connections from said source and destination addresses and associate each node to a corresponding node identifier;

constructing an abstract model representing said communication network, wherein each node is represented by the corresponding node identifier and each node connection is represented by a corresponding link between respective nodes.

BRIEF DESCRIPTION OF THE DRAWINGS

Further characteristics and advantages will be more apparent from the following description of the various embodiments given as a way of an example with reference to the enclosed drawings in which:

FIG. 3 shows an example of a method of enriching said graph with asset technical information.

DETAILED DESCRIPTION

Figure 1:
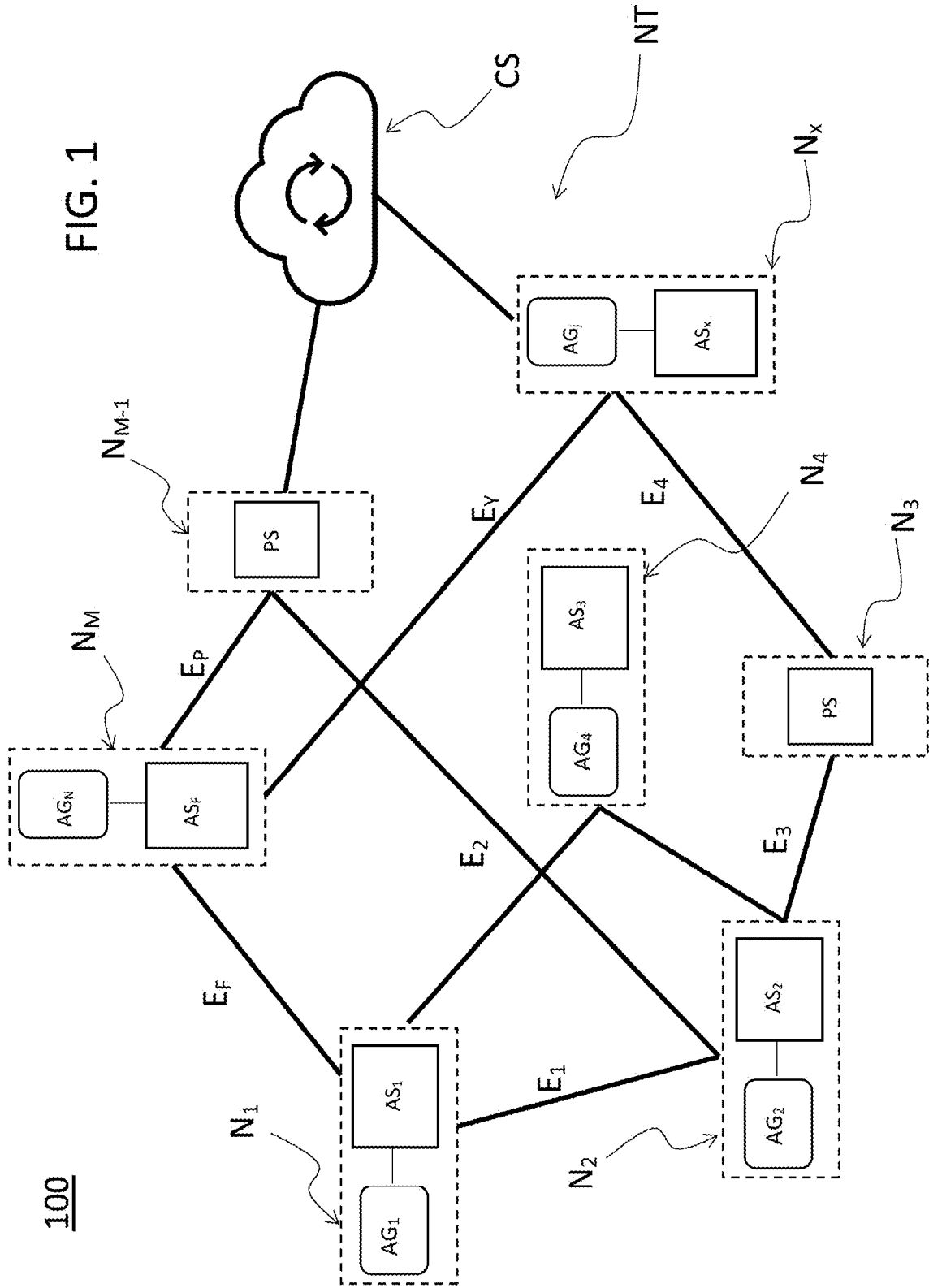
FIG. 1 schematically shows an example of network monitoring system including a communication network.

FIG. 1 shows an example of a network monitoring system 100 comprising a communication network NT including a plurality of nodes $N_1$-$N_M$ and a plurality of connections (or, equivalently, links) $E_1$-$E_P$ between nodes.

Part of the plurality of nodes (as an example, a first node $N_1$ and a second node $N_2$) includes a respective asset $AS_1$ ($AS_1$-$AS_F$) which is associable to a specific entity (e.g. a private entity).

With the term "asset" is meant a physical or virtual network-enabled equipment that is physically connected inside the network. Each of the assets $AS_1$-$AS_F$ comprises hardware (e.g. computer, switches, routers), software (e.g. mission critical applications and support systems) and may store confidential information An asset can be a computer, a tablet, a printer, or any other kind of device able to communicate in a TCP/IP or a like network. Particularly, each of the assets $AS_1$-$AS_F$ comprises a computer running any version of Windows, Linux or macOS.

The term "connection" means a model which represents a communication between two assets over the network with some protocol. An asset can communicate or have the possibility to communicate with other assets. If an asset can communicate with another asset, they have a common link. Computer networks can have several components in between assets and different equipment types (routers, firewalls, application firewalls, etc.) exist that can inhibit all or some protocols between two assets.

Another part of the plurality of nodes (such as a third node $N_3$) may include public servers PS (or other public devices) and therefore such nodes are non-considered assets, according to the present description.

Each of the nodes $N_1$-$N_M$ of the communication network NT is configured to receive and transmit packets over the connections $E_1$-$E_P$, according to packet switching technologies. Particularly, the communication network NT operates according to an Internet Protocol. As it is well known, the term "packet" means a finite sequence of bytes that represents a message exchanged between assets on a network, in particular between two nodes. Each protocol defines a particular structure for the set of valid packets that could be exchanged, and it defines the rules that govern a sensible communication.

The network monitoring system 100 further comprises at least one monitoring computer provided with monitoring software resources, connected to the network NT. Such monitoring computer and software resources are external to the assets $AS_1$-$AS_F$ and the nodes $N_1$-$N_M$ and, particularly, can be provided under the form of a cloud service CS. In the embodiment described below, reference is made to the exemplary use of the cloud service CS.

Moreover, each node including an asset $AS_1$-$AS_F$ (or part of them) is provided with a software agent $AG_1$-$AG_N$ configured to capture packets from the respective asset in which it is installed ad redirect them towards the cloud service CS. Particularly, the software agents $AG_1$-$AG_N$ may have also analysis capabilities and, therefore, are packet sniffers which can perform Deep Patent Inspection (DPI). In details, each agent $AG_1$-$AG_N$ is stored in the corresponding asset $AS_1$-$AS_F$.

Each software agent $AG_1$-$AG_N$ has the following basic attributes, typical of any agents:

the agent is not strictly invoked for a task, but activate himselves, the agent may reside in wait status on the asset, perceiving context, the agent may get to run status on an asset upon starting conditions, the agent does not require interaction of user.

It is observed that in the following description every node including an asset provided with a corresponding agent (such as the first node $N_1$) is also called "endpoint". The packet traffic can be captured and/or analysed by an agent $AG_j$ from every network interface of an endpoint Nx.

As it will be further clarified in the following, the cloud service CS is configured to process the packet traffic received by the agent $AG_1$-$AG_F$ and construct an abstract model representing the communication network NT. Particularly, the abstract model can be under the form of a topological graph of the network NT.

Moreover, the cloud service CS can be configured to receive from the agents $AG_1$-$AG_F$ additional information concerning the respective assets $AS_1$-$AS_N$ and associate such additional information to the respective node in the abstract model such as the topological graph. The cloud service CS can be provided with additional DPI capabilities.

An example of a method for constructing an abstract network model is described below. Said method can be implemented by the network monitoring system 100 described above.

Every software agent $AG_1$-$AG_N$ captures packet traffic from the respective endpoint on which is installed and sends (as an example, periodically) such traffic to the cloud service CS. The software agent $AG_1$-$AG_N$ are able to observe the interaction between an asset and the public internet.

The cloud service CS extracts from said received packets source addresses and destination addresses. Particularly, thanks to its DPI capabilities, the cloud service CS decodes every packet received from the agents $AG_1$-$AG_N$ and understands a wide range of protocols and network layers. A non-limitative list of exemplary protocols can be found at the following web page: https://www.nozominetworks.com/resources/protocol-support-list.

As an example, the cloud service CS extracts source and destination IP addresses from the network-layer (i.e. the $3^{rd}$ layer of the Open Systems Interconnection model—OSI model). As it is known, the IP addresses are used to uniquely identifies the connection of the network with that device takes part in a network.

In an embodiment, the cloud service CS may extract source and destination MAC (Media Access Protocol) addresses. A MAC address, sometimes referred to as a hardware or physical address, is a unique, 12-character alphanumeric attribute that is used to identify individual electronic devices on a network. The MAC addresses are extracted from the physical layer (i.e. the $2^{nd}$ layer of OSI model).

From the extracted addresses the cloud service CS identifies the plurality of nodes $N_1$-$N_M$ (particularly, the assets $AS_1$-$AS_F$ and the public devices PS) and the plurality of node connections $E_1$-$E_P$ between the nodes and associate each node to a corresponding node identifier (such as the respective IP address).

As an example, the first software agent $AG_1$ observes the followings node connections (i.e. links):
192.168.1.15 (node $N_M$)↔192.168.1.16 (node $N_1$)
192.168.1.12 (node $N_3$)↔192.168.1.14 (node $N_x$)

The second software agent $AG_2$ observes these node connections:
192.168.1.12 (node $N_3$)↔192.168.1.13 (node $N_2$)
192.168.1.12 (node $N_3$)↔192.168.1.16 (node $N_1$)
192.168.1.13 (node $N_2$)↔192.168.1.17 (node $N_{M-1}$)

The j-th software agent $AG_j$ observes these node connections:
192.168.1.17 (node $N_{M-1}$)↔192.168.1.18 (node $N_4$)
192.168.1.16 (node $N_1$)↔192.168.1.18 (node $N_4$)
192.168.1.13 (node $N_2$)↔192.168.1.17 (node $N_{M-1}$)

Figure 2:
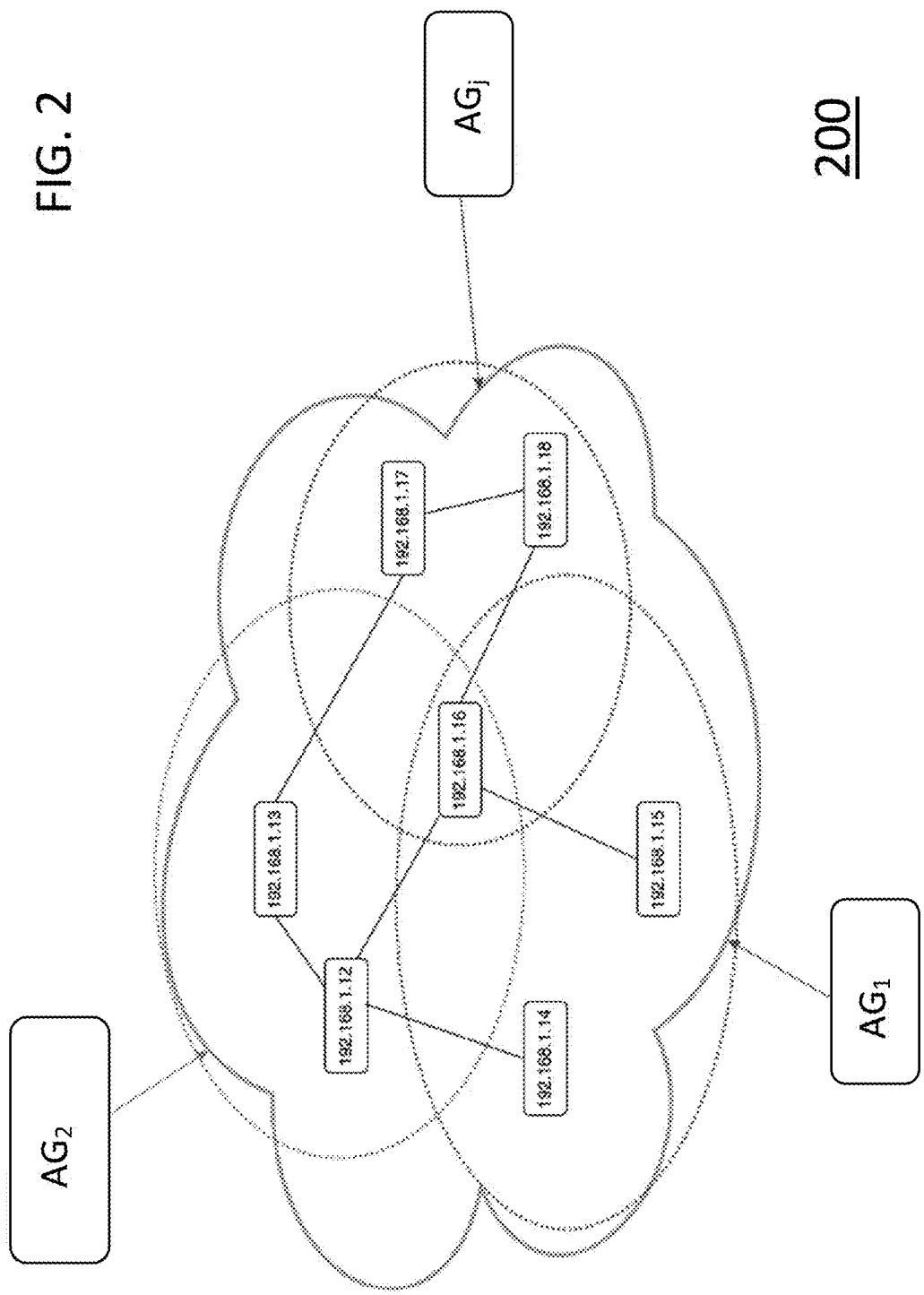
FIG. 2 shows an example of a graph representing said communication network as obtainable from said network monitoring system.

With the knowledge of the node identifiers and the node connections, the cloud service CS elaborates and stores an abstract model of the network NT. Such abstract model may be represented by a topological graph 200 (shown in FIG. 2) which describes the communication network NT.

The abstract model is accessible to a user and, particularly, the graph 200 is displayable by the user of the cloud service CS on a monitor, in order to get a clear description of the network NT.

It is noticed that the construction of the graph 200 is performed by the cloud service CS thanks to the fact the software agents $AG_1$-$AG_N$ globally provides redundant information and so the cloud service CS can merge all the links and create the global network graph 200.

Moreover, it is observed that the graph 200 can be represented by a set of pairs where each item in a pair represents a node in the graph and the pair itself represent a link between nodes. The cloud service CS receives the list of pairs and merges the duplicated, the resulting set can be directly rendered as a graph.

According to another embodiment, the network monitoring system 100 is further configured to enrich the abstract model above described with technical information on each asset $AS_1$-$AS_F$ and associate each information to the corresponding node.

According to this embodiment, the software agents $AG_1$-$AG_N$ are packet sniffers adapted to perform Deep Patent Inspection (DPI) on the assets $AS_1$-$AS_F$ and also extract information about the public network (such as the public servers PS). Particularly, at least part of the software agents $AG_1$-$AG_N$ are also configured to extract information by directly calling the operating system API (Application Program Interface) of the assets.

In an embodiment, each software agent $AG_1$-$AG_F$ may extract and send to the cloud service CS one or more of the following technical data related to the corresponding asset: host label, operating system version, firmware version in case of an OT (Operation Technology) device, CPU (Central Processing Unit) usage, RAM (Random Access Memory) usage, disk usage, installed software, etc.

OT is hardware and software that detects or causes a change, through the direct monitoring and/or control of industrial equipment, assets, processes and events. CPU usage indicates the total percentage of processing power exhausted to process data and run various programs on a network device, server, or computer at any given point.

As an example, the agents $AG_1$-$AG_F$ may operate as indicated below, with reference to FIG. 3.

The second software agent $AG_2$ observes the endpoint 192.168.1.16 (corresponding to first node $N_1$ as an example) and extracts the CPU usage (e.g. 55%, time: z) from a SNMP (Simple Network Management Protocol) packet and the firmware version (e.g. 14.5, time: a) from an Ethernet/IP packet. As indicated above, every field has a timestamp (time: z; time: a) associated to it to mark the observation time of each value. The second software agent $AG_2$ sends these two fields (INF1) to the cloud service CS.

The first software agent $AG_1$, that is installed on the endpoint 192.168.1.16, extracts the CPU usage (e.g. 50%, time: y) and host label (label: "lbl", time: x), together with the corresponding timestamps, directly via the endpoint operating system APIs of this endpoint ($N_1$). The first software agent $AG_1$ sends these two fields (INF2) to the cloud service CS in the same way the second agent $AG_2$ did.

The cloud service CS receive label, CPU and firmware_version for the endpoint 192.168.1.16 and process said information to enrich the network model. The label and firmware_version information received from the first and second software agents $AG_1$ and $AG_2$ are complementary and don't have any conflict; therefore the cloud service CS adds to the endpoint 192.168.1.16 the label ("lbl"-time: x) and firmware_version (14.5, time: a) information.

With reference to the CPU usage there is a conflict between the values received from the first and second software agents $AG_1$ and $AG_2$. Such conflict of information on the CPU usage field is resolved by choosing the value that has been more recently extracted: the CPU usage at time z is more recent than that at time x. In the final form, asset 192.168.1.16 contains three fields and is represented in FIG. 3 (INF3).

Particularly, as regard the processing performed by the cloud service CS in merging information, every piece of information is represented as a pair comprising a key and a value, e.g. key=label, value="lbl". Moreover, each pair has a timestamp attached that represent the freshness of the information. In performing said merging, the cloud service CS considers that keys are unique i.e., an asset can only contain a single instance of every key.

When a key that already exists is going to be added to the abstract model, so as to be associated to a corresponding node $N_1$-$N_M$, a conflict is triggered. This conflict is resolved by considering the timestamps of the values received by the cloud service CS: the value assumed by a key that have the most recent timestamp is attached to the description of that node in the abstract model. When, adding a key/value pair to a node, there is no conflict, the information is simply added to the abstract model and associated to the specific asset.

It is observed that the software agent $AG_1$-$AG_F$ and/or the cloud service CS can be configured to also perform anomaly detection and the result of such detection can be integrated in the abstract model and displayed into the graph 200 representing the network NT.

The network monitoring system 100 and the method according to the present description find a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The above disclosed monitoring system and method ensure a full network visibility avoiding the use of dedicated hardware thanks to the software agents installed in the assets of the network. The software resources dedicated to the abstract model construction, such as the cloud service, are configured to inspect a wide range of protocol and network layers on the packet traffic redirected by the software agents fully overcoming the need of a dedicated device associated to each asset.

The fact that the above-described monitoring system is able to extract and merge several types of technical information regarding the asset allows obtaining a complete asset inventory enriching the abstract model of the network.

The invention claimed is:

1. A network monitoring system comprising:
   a communication network comprising a plurality of nodes and a plurality of node connections; wherein each node comprises an asset configured to receive/transmit packets;
   a cloud computing service;
   a plurality of software agents each installed in at least part of said plurality of nodes; each software agent being configured to redirect packets from a respective asset to said cloud computing service;
   wherein said cloud computing service is provided with software resources configured to: receive the packets sent by each software agent;
   extract from said packets source addresses and destination addresses;
   identify the plurality of nodes and the plurality of node connections from said source and destination addresses and associate each node to a corresponding node identifier;
   constructing an abstract model representing said communication network, wherein each node is represented by the corresponding node identifier and each node connection is represented by a corresponding link between respective nodes.

2. The network monitoring system according to claim 1, wherein said software resources are configured to construct the abstract model under the form of a displayable topological graph.

3. The network monitoring system according to claim 1, wherein said software resources are configured so said source address destination addresses include addresses of the network layer from which the software resources are configured to identify links between nodes.

4. The network monitoring system according to claim 3, wherein said software resources are configured so that said source addresses and destination addresses include addresses of the physical layer from which the software resources are configured to identify links between nodes.

5. The network monitoring system according to claim 1, wherein said software resources have Deep Packet Inspection capabilities.

6. The network monitoring system according to claim 1, wherein: the plurality of nodes is associated to a managing entity;
   the communication network further includes at least one public network device.

7. The network monitoring system according to claim 1, wherein said plurality of software agents is configured to operate as packet sniffers.

8. The network monitoring system according to claim 7, wherein said plurality of software agents is configured to operate as packet sniffers and extract from said packet at least one of the following technical information relating to each asset: host label, operating system version, firmware version in case of an Operation Technology device, Central Processing Unit usage, RAM Random Access Memoly usage, disk usage, installed software.

9. The network monitoring system according to claim 8, wherein the plurality of software agents is configured to associate to the technical information relating to each asset a timestamp representing an extraction time.

10. The network monitoring system according to claim 9, wherein said software resources are configured to:
    perform a merging process by processing the technical information received by the plurality of software agents;
    associate to each node of the abstract model a corresponding technical information relating to the corresponding asset.

11. The network monitoring system according to claim 10, wherein said software resources are configured to:
    receive from a first software agent a first value assumed by a technical information key; the first value being associated with a first timestamp value and related to a selected node;
    receive from a second software agent a second value assumed by said technical information key; the second value being associated with a second timestamp value and related to said selected node;
    selectively associate to the abstract model the first value and the second value depending on said first and second timestamp values.

12. The network monitoring system according to claim 1, wherein said software resource and/or said plurality of agents are configured to perform anomaly detection.

13. A network monitoring method comprising:
    accessing a communication network comprising a plurality of nodes and a plurality of node comlections; wherein each node comprises an asset configured to receive/transmit packets;
    providing a cloud computing service;
    providing a plurality of software agents each installed in at least part of said plurality of nodes; each software agent being configured to redirect packets from a respective asset;
    wherein said cloud computing service has software resources configured to:
    receive the packets sent by each software agent;
    extract from said packets source addresses and destination addresses;
    identify the plurality of nodes and the plurality of node connections from said source and destination addresses and associate each node to a corresponding node identifier;
    constructing an abstract model representing said communication network, wherein each node is represented by the corresponding node identifier and each node connection is represented by a corresponding link between respective nodes.

14. The network monitoring method according to claim 13, wherein said software resources are configured so that said source addresses and destination addresses include addresses of the physical layer from which the software resources are configured to identify links between nodes.

* * * * *